United States Patent Office 3,843,481
Patented Oct. 22, 1974

---

3,843,481
PLASTIC LAMINATE
Klaus Hoheisel, Wiesbaden-Biebrich, Germany, assignor to Kalle Aktiengesellschaft, Wiesbaden-Biebrich, Germany
No Drawing. Filed Oct. 19, 1972, Ser. No. 298,833
Claims priority, application Germany, Oct. 21, 1971,
P 21 52 364.8
Int. Cl. B22b 27/40
U.S. Cl. 161—190          13 Claims

ABSTRACT OF THE DISCLOSURE

This invention relates to a laminate including a polyester base film having on at least one side, a film-like covering layer of an aromatic polyamide, polyamide-imide or polyimide and between the base film and the covering layer an intermediate layer of the reaction product of at least one aromatic polyisocyanate with at least one epoxide resin of the general formula

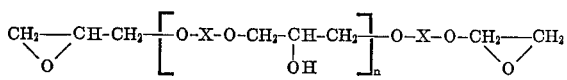

in which X is at least one radical of the formulae:

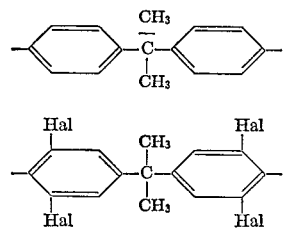

(Hal=Br or Cl),

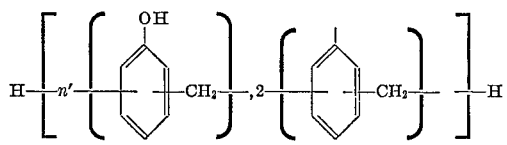

and

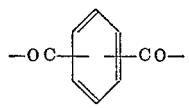

$n$ is a number $\geq 10$ and $n'$ is a number from 2 to 8.

---

This invention relates to a plastic laminate.

Owing to their excellent mechanical, dielectric and thermal properties and also because of their relatively favorable cost, polyester films, particularly stretched films, preferably those of polyethylene terephthalate, are employed at the present time on a large scale in industry, for example in the electrical field, especially in motor insulation, cable insulation and as the base material for flexible printed circuits. However, a number of applications in this field cannot be satisfied with the known polyester films because their heat resistance and/or flame resistance is too low. Frequently, it is the more recent technical applications, not least those which are related to developments in modern aviation, space travel and armaments technology, in which the properties of the polyester films no longer meet the requirements in respect of heat resistance and/or flame resistance.

It is mainly the demand for continuous heat resistance, for example in the trend towards high performance motors and instruments, in most cases associatetd with the desire for a reduction in size thereof, which is not met.

A further important shortcoming is to be found in the properties of inflammability and flame transmission of the films. Though these are still regarded as adequate for some applications, they are becoming unsatisfactory because of the generally increasing need for safety in certain applications, for example in the field of constructional units.

According to German Standard Test Specification VDE 0304, for example, polyethylene terephthalate films are graded in heat category B as regards continuous heat resistance. According to definition, this means that the film can be heated for 25,000 hours at temperatures in the range of 130° to 154° C. without losing properties important in electrical or mechanical use. The time-temperature limit of polyethylene terephthalate film is frequently essentially determined by embrittlement phenomena, i.e., by loss in mechanical properties.

In practice, this time-temperature limit for polyethylene terephthalate films is stated in terms of temperatures up to 150° C. What is at present demanded, above all as a result of progress in technology, are materials of the next-higher heat categories F and H, of which the corresponding time-temperature limits are specified as at least 155° and 180° C., respectively.

There has therefore been no lack of attempts to provide materials of higher heat resistance and/or flame resistance, such as are possessed, for example, by polytetrafluoroethylene films, which are, however, very expensive and relatively difficult to manufacture and which, for many end uses, display an inadequate dielectric strength and have a corrosive effect upon exposure to excessive heat.

It is also known, from "Kunststoffe," volume 58, 1968, No. 12, page 945, that the continuous heat resistance of polyethylene terephthalate films can be improved up to the standard of heat category F if the film is laminated to a fleece of a special heat-resistant polyamide. The excellent mechanical properties of these fleece layers evidently still manifest themselves adequately in the laminate; this is also supported, for example, by the fact that the thicker laminates are frequently additionally reinforced with a glass fiber fabric. However, the material has serious disadvantages which considerably restrict its use. For example, the dielectric strength is reduced by the porous fleece component. Furthermore, when using such materials in totally enclosed motors with coolant circulation the operating reliability is greatly reduced, since, as a result of the insulating material being constantly flushed, the coolant may become contaminated by fibers or fiber particles which are detached or break off, and as a result the valves may be impaired or become blocked. The fibrous surfaces of these materials furthermore interfere with their use as a base material in flexible printed circuits or as cable tapes.

The problem thus arose of first improving the heat resistance and/or flame resistance of a polyester film and, second, of avoiding the shortcomings of the materials described above, thereby rendering the material universally applicable.

The present invention provides a laminate including a polyester base film having on one or both sides, a film-like covering layer of an aromatic polyamide, polyamide-imide or polyimide and between the base film and the covering layer an intermediate layer of the reaction product of at least one aromatic polyisocyanate with at least one epoxide resin of the general formula

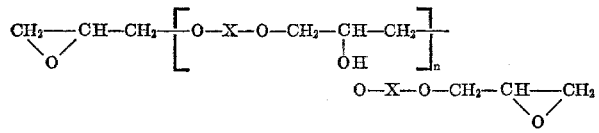

in which X is an arylene radical, especially of the formula

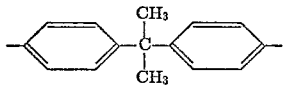

and/or

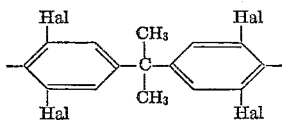

(Hal=Br or Cl), and/or

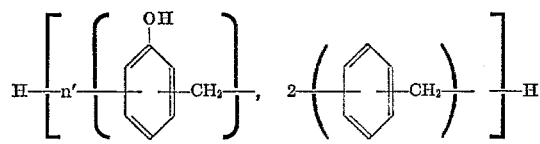

and/or an aromatic diacyl radical, especially

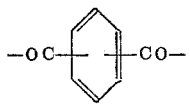

$n$ is a number $\geq 10$ and $n'$ is a number from 2 to 8.

It has been found, surprisingly, that the heat resistance and/or flame resistance of the polyester films can be improved substantially, in the direction of a higher heat category, though the covering layers and the intermediate layers are only relatively thin ($\mu$m. range) compared to the base films. In a preferred embodiment, the thicknesses of the covering layers are in the range of 5 to 20% and those of the intermediate layers are in the range of 1 to 10% of the thickness of the base film.

It has furthermore proved in a surprising manner that even on prolonged heat exposure the good adhesion achieved between the layers remains preserved. In a long-term laboratory test on electrical motors at temperatures of up to 190° C. it was found that motors equipped with the laminate according to the invention on average ran approximately 30 to 50% longer without failure of the insulation than did those equipped with conventional insulating materials based on polyethylene terephthalate films.

Another long-term test was carried out on small motors according to AIEE Test Specification No. 510, November 1956, which is a test resembling practical use, wherein the motors are subjected, in cycles, to severe mechanical, thermal, moisture and voltage conditions. A visual examination of the laminate according to the invention after stopping the experiments after 20 or 24 days showed, in comparison with such motors insulated with conventional polyethylene terephthalate film, that 20 to 50% longer exposure was possible without any mechanical destruction phenomena occurring.

Another ageing test with extreme loading of the materials consisted, for example, in subjecting finished insulated motor units over periods to a series of long-term treatments and shock treatments, for example several hours' heating to temperatures around 200° C. and subsequent quenching in water, and exposure of various motor components to a high voltage of 2.5 kv. for some seconds. The criterion of the quality of the material was here the number of cycles achieved until a defect developed. In this test an increase in working life of, on average, more than 100% was found as compared to conventional heat catageory B insulating materials, which also include the conventional polyester films.

The distinctly improved flame resistance or flame repellent property should be mentioned as a further advantage of the laminates according to the invention. Samples withdrawn from the flame became self-extinguished after a few seconds only. This was not the case for conventioned polyester-based materials.

The polyester films which can be used according to the invention, especially those of polyethylene terephthalate, a co-condensate or a mixture of polyethylene terephthalate with other polyesters, are preferably stretched, in particular orthogonally biaxially stretched, and are preferably heat-set in order to improve the mechanical properties, for example the tensile strength, as compared to amorphous films.

In the case of single-sided coating of the base film it is also possible, according to the invention, to use unstretched or preferably multi-axially or longitudinally stretched tubular films. Otherwise, extruded flat films or a flat film produced from a tube are used.

In a further embodiment of the laminate, the base film possesses isotropic or almost isotropic mechanical properties in the plane of the film, this being achieved by appropritate selection of raw material, stretching and thermal fixing.

The polyethylene terephthalate preferably used for the manufacture of the base film is the homopolycondensate but co-condensates or mixtures with other polyesters also can be used, in which case the proportions should be so selected that the properties are not modified significantly. Mixtures of polyethylene terephthalate with other aromatic polyesters or co-condensates which in addition to the constituents of the polyethylene terephthalate are produced from aromatic dicarboxylic acids, for example isophthalic acid, naphthalene-2,6-dicarboxylic acid or 1,2-diphenoxyethane-4,4'-dicarboxylic acid and/or other aromatic dihydroxy compounds such as hydroquinone or resorcinol, are preferred. In a preferred embodiment, the base film has a molecular weight of below 17,500 (determined from the specific solution viscosity in phenol/tetrachloroethane, 60:40, at a concentration c.=1 g./100 ml. of solvent by the Griehl-Neue method, "Faserforschung und Textiltechnik" 5, 1954 page 423) such a raw material suitable for this purpose can be manufactured cheaply and technically more simply.

The polyester can be manufactured in a known manner using the customary catalysts, for example calcium acetate, zinc acetate, manganese acetate, antimony trioxide or germanium dioxide and the known stabilizers, for example phosphorous compounds such as triphenyl phosphate, trisnonylphenyl phosphite, phosphorous acid or phosphoric acid, either in a two-stage process, starting from the bisalkyl terephthalates, such as dimethyl terephthalate, and via the stage of the bis-glycol acid ester or in the single-step process of the direct esterification of terephthalic acid. The film can furthermore contain additives such as glass fibers, dyestuffs, pigments, antistatic agents, and slip agents, such as finely divided solids or waxes. The film surfaces can be roughened mechanically or by sand-blasting. It is also possible, in order to improve the adhesion, to pretreat the surface according to one of the known processes, for example by chemical oxidation, for example with potassium dichromate, chloroacetic acid or ozone, by flame oxidation or by corona discharge in air and other gases.

Among the aromatic polyamide, polyamide-imide and polyimide resins to be used according to the invention are the known heat-stable aromatic compounds which are preferably soluble or swellable in organic solvents, or their soluble precursors which still possess free pairs, capable of imide formation between one another, of carbonamide (—CO—NH—) and carboxylic acid (—COOH) groups or carbonamide and carboxylic acid ester (—COOR)

groups, for example methylcarboxylate (—COOCH$_3$), phenylcarboxylate

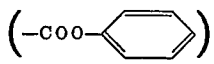

or p-methoxyphenylcarboxylate

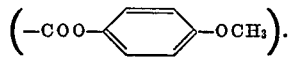

They are manufactured according to known methods from the corresponding reactive aromatic acid components and aromatic amine components, reactions of the following compounds being possible.

As aromatic polycarboxylic acids or polycarboxylic acid derivatives, for example the following are employed:

Pyromellitic acid dianhydride,
3,3',4,4'-benzophenone-tetracarboxylic acid dianhydride,
3,3',4,4'-diphenyl-ether-tetracarboxylic acid dianhydride,
3,3',4,4'-diphenylsulfone-tetracarboxylic acid dianhydride,
1,4,5,8-naphthalene-tetracarboxylic acid dianhydride,
trimellitic acid anhydride,
pyromellitic acid-1,4-dimethyl ester,
pyromellitic acid-1,5-dimethyl ester,
pyromellitic acid-1,4-diphenyl ester,
pyromellitic acid-1,4-bis-(4-methoxyphenyl) ester,
5-methoxy-carboxy-terephthalic acid,
5-phenoxycarboxy-terephthalic acid,
5(4-methoxyphenoxy)terephthalic acid,
4-(4-methoxyphenoxy)isophthalic acid,
3,3'-di(2-methoxy-ethylcarboxy')-4,4'-benzophenone-dicarboxylic acid,
2,2',3,3'-diphenyltetracarboxylic acid dianhydride,
pyromellitic acid-1,4-dimethyl ester-2,5-dichloride,
trimellitic acid anhydride-chloride, and
2,3,6,7-naphthalene-tetracarboxylic acid dianhydride.

As aromatic diamines or diamine derivatives, for example in the form of diisocyanates, for example the following are employed:

1,3-diaminobenzene,
1,4-diaminobenzene,
1,4-diamino-diphenyl,
1,4-diaminodiphenyl-ether,
1,4-diaminodiphenyl-sulfone,
1,4-diaminodiphenylmethane,
1,4-diaminodiphenylsulfide,
1,3-phenylene-diisocyanate,
toluene-2,4-diisocyanate,
toluene-2,6-diisocyanate,
diphenyl-4,4'-diisocyanate,
diphenylmethane-4,4'-diisocyanate,
2,2-diphenylpropane-4,4'-diisocyanate,
diphenyl-ether-4,4'-diisocyanate, and
diphenylsulfone-4,4'-diisocyanate.

In order to obtain laminates of particularly high abrasion resistance in the covering layers it has proved particularly appropriate that the laminate should possess at least as the outermost covering layer a polyamide, polyamide-imide or polyimide resin in the chain of which heterocyclic units are incorporated. Covering layers of polyamide-imides which contain heterocyclic units of the formula

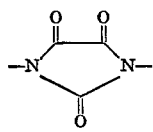

have proved particularly suitable. Of the last-mentioned compounds, those which are produced from trimellitic acid as the acid component are in turn preferred.

The resins can be formed from only one starting compound in each case or from mixtures of starting components of the same type. The resin covering layers can contain additives such as have been mentioned for the polyester films. The invention also provides for several covering layers to be applied on top of one another or for different thicknesses to be applied in the case of coating on both sides. There is also the possibility of applying several covering layers of different composition and/or structure to the base film in order thus to vary the physical behavior of the laminate.

The intermediate layers used according to the invention consist of reaction products of soluble, aromatic epoxide resins manufactured from aromatic dihydroxy compounds with epichlorohydrin, with aromatic polyisocyanates such as diphenyl-ether-4,4'-diisocyanate,
diphenylmethane-4,4'-diisocyanate,
triphenylthiophosphate-4,4',4''-triisocyanate,
toluene-2,4-diisocyanate,
toluene-2,6-diisocyanate,
naphthalene-1,5-diisocyanate or triphenylmethane-4,4',4''-triisocyanate,
2,2-diphenylpropane-4,4'-diisocyanate, or mixtures thereof.

The reaction is carried out in solution, for example in methylene chloride, chloroform, trichloroethylene, ethyl acetate, dimethylformamide, N-methylpyrrolidone or mixtures thereof, optionally with the use of catalysts such as tertiary amines, for example triethylamine, or metal salts such as cobalt naphthenate, the equivalent weight ratio of the epoxide resins and the polyisocyanates being 2:1 to 1:2.

In the case of these compounds, again, mixtures can be used for the reaction. Additives, for example consisting of generally known adhesion promoters, pigments and dyestuffs, may be incorporated. The intermediate layers also can be applied in different thicknesses and/or structures and/or compositions.

The reaction product is applied to the polyester film surface according to known application processes, for example dipping, spraying, roller application or flow coating, preferably by gravure roller application, in the thicknesses of, for example, 2 to 6 μm. which are customary for intermediate layers. A subsequent heating is generally not necessary but, if desired, may be carried out for further improving the adhesion between the base film and the intermediate layer.

After application of the intermediate layers which are optionally applied as a multiple layer, as described above, the covering layers are applied, also as multiple layers in some cases. This can be effected by preferred application from solvents or from suitable aqueous or mixed aqueous-organic dispersions or by extrusion coating, for example in the gel form. However, an obvious prerequisite if a melt extrusion coating is to be carried out is that the extrusion conditions must be so selected, for example by suitable differential cooling of the base film with the intermediate layer, that the extrusion does not cause these materials to deteriorate. Furthermore, the covering layers optionally can be applied as films onto the base films provided with the intermediate layers, using pressure and/or heat.

It is also possible to apply the intermediate layer and/or the covering layer before stretching the base film at all, the latter then being stretched monoaxially or biaxially, or to carry out a first stretching step on the base film, after which the intermediate layer and/or covering layer are applied and a second stretching step then follows.

It is also possible to employ an additional post-stretched film, or to post-stretch such a film after coating.

As a result of the improved heat resistance and/or flame resistance of the laminate, achieved according to the invention, the laminate mainly can be used in higher heat categories for which the previous polyester films were not suitable or which led to premature wear under continuous load. The laminates according to the invention have in particular proved especially suitable for use as a thin electrically insulating laminate, for example for insulations or as a base material for printed circuits.

The following Example further illustrates the invention:

EXAMPLE

A polyamide-carboxylic acid from trimellitic acid and 4,4'-diaminophenyl ether, which is 70% imidized, is used as polyimide resin for the manufacture of the covering layer. The polyimide resin is applied to both sides of a 300μ thick polyethylene terephthalate film, which has been provided with the intermediate layer described below and been biaxially stretched and heat-set, from an 8 percent by weight solution in N-methylpyrrolidone, at a thickness of 15μ. using a flow coater. The intermediate layers used consist of the reaction product of a high molecular weight epoxide resin based on 4,4'-dihydroxy-2,2'-diphenylpropane and epichlorohydrin (molecular weight about 20,000) with naphthalene-1,5-diisocyanate in a weight ratio of 100:19.5, in a mixture of chloroform and ethylene acetate in the volume ratio of 8:2, at 20° C. It is applied by means of rollers in 3μ thickness from a 5 percent by weight solution in the solvent mixture indicated.

The adhesion of the laminate was very good and on repeating the Example several times gave an average value of over 100 g./cm. Tests of the type indicated above showed, on average, a continuous heat resistance improved by at least 100% over a comparable polyethylene terephthalate film.

It will be obvious to those skilled in the art that many modifications may be made within the scope of the present invention without departing from the spirit thereof, and the invention includes all such modifications.

What is claimed is:

1. A laminate including a polyester base film having on at least one side, a film-like covering layer of an aromatic polyamide, polyamide-imide or polyimide and between the base film and the covering layer an intermediate layer of the reaction product of at least one aromatic polyisocyanate with at least one epoxide resin of the general formula

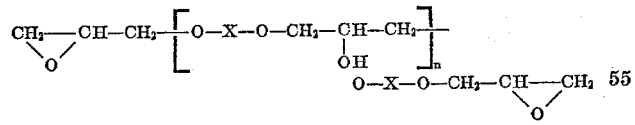

in which X is at least one radical of the formulae:

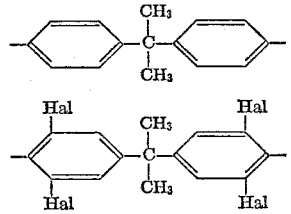

(Hal=Br or Cl),

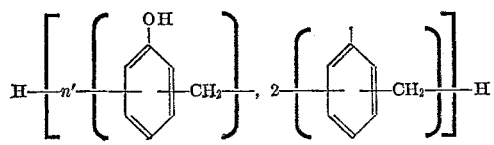

and

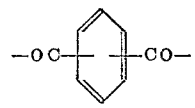

n is a number ≥10 and n' is a number from 2 to 8.

2. A laminate as claimed in claim 1 in which the polyester base film is polyethylene terephthalate, a co-condensate or a mixture of polyethylene terephthalate with other polyesters.

3. A laminate as claimed in claim 1 in which the polyester base film is stretched.

4. A laminate as claimed in claim 1 in which the polyester base film is heat-set.

5. A laminate as claimed in claim 1, in which the polyester base film possesses substantially isotropic mechanical properties in the plane of the film.

6. A laminate as claimed in claim 1 in which the polyester base film has a molecular weight less than 17,500.

7. A laminate as claimed in claim 1 in which at least the outermost covering layer is a polyamide, polyamide-imide or polyimide resin in the chain of which heterocyclic units are incorporated.

8. A laminate as claimed in claim 1 in which at least the outermost covering layer is a polyamide-imide resin in the chain of which are incorporated heterocyclic units of the formula

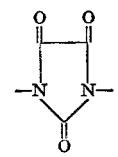

9. A laminate as claimed in claim 8 in which the covering layer is a polyamide-imide resin with trimellitic acid as the acid component.

10. A laminate as claimed in claim 1 in which the thickness of the covering layer is in the range of 5 to 20% of the thickness of the base film.

11. A laminate as claimed in claim 1 in which the thickness of the intermediate layer is in the range of 1 to 10% of the thickness of the base film.

12. A laminate as claimed in claim 1 including, on at least one side of the base film, a plurality of layers of the nature of covering layers which layers differ from each other.

13. A laminate as claimed in claim 1 including, on at least one side of the base film, intermediate layers which differ from each other.

References Cited

UNITED STATES PATENTS

| | | | |
|---|---|---|---|
| 2,976,202 | 3/1961 | Salem et al. | 161—227 |
| 3,649,439 | 3/1972 | Ross | 161—231 |
| 2,955,961 | 10/1960 | Koller | 161—190 |
| 3,312,663 | 4/1967 | Sorenson | 161—227 |
| 3,485,796 | 12/1969 | Naselow | 117—161 P |
| 3,245,925 | 4/1966 | Watson | 117—72 |
| 3,689,464 | 9/1972 | Holub et al. | 117—161 P |
| 3,714,131 | 1/1973 | Hoback et al. | 117—161 P |
| 3,748,304 | 7/1973 | Stephens | 117—161 P |
| 3,554,984 | 1/1971 | George | 117—161 P |

GEORGE F. LESMES, Primary Examiner

W. R. DIXON, Jr., Assistant Examiner

U.S. Cl. X.R.

117—72, 76 F, 138.8 F; 161—227, 231, 233; 156—229, 330